(12) United States Patent
Huang

(10) Patent No.: US 7,839,267 B2
(45) Date of Patent: Nov. 23, 2010

(54) METHOD FOR STARTING AN OPERATING SYSTEM OF A HANDHELD DEVICE

(75) Inventor: Tzu-Hao Huang, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 376 days.

(21) Appl. No.: 12/138,432

(22) Filed: Jun. 13, 2008

(65) Prior Publication Data

US 2009/0051504 A1    Feb. 26, 2009

(30) Foreign Application Priority Data

Aug. 24, 2007    (CN) .......................... 200710201468

(51) Int. Cl.
*G08B 1/00* (2006.01)

(52) U.S. Cl. ............... 340/309.5; 340/309.8; 340/309.9

(58) Field of Classification Search ............ 340/309.16, 340/309.3, 309.4, 309.5, 309.8, 309.9, 7.52, 340/7.27, 7.39; 315/360, 362, 307
See application file for complete search history.

(56) References Cited

U.S. PATENT DOCUMENTS

| | | | |
|---|---|---|---|
| 4,593,234 A * | 6/1986 | Yang | 315/362 |
| 6,008,720 A * | 12/1999 | Hongu et al. | 340/309.16 |
| 6,529,117 B1 * | 3/2003 | Narusawa | 340/7.52 |
| 6,771,163 B2 * | 8/2004 | Linnett et al. | 340/309.5 |
| 7,177,630 B2 | 2/2007 | Silva | |
| 2007/0036036 A1 * | 2/2007 | Kadish et al. | 368/230 |

* cited by examiner

*Primary Examiner*—Van T. Trieu
(74) *Attorney, Agent, or Firm*—Frank R. Niranjan

(57) ABSTRACT

A method for starting an operating system of a handheld device includes: setting an alarm time of an alarm clock as T seconds after a current system time of the handheld device when the handheld device is in a standby mode; monitoring the current system time of the handheld device until the current system time reaches a time that is N seconds before the set alarm time; repeating the setting step and the monitoring step, until the handheld device is turned off; determining whether the current system time is equal to the alarm time of the alarm clock when the handheld device is turned on; if yes, starting the operating system of the handheld device without executing boot-strap programs and making the operating system go to the standby mode directly; otherwise starting the operating system of the handheld device by executing boot-strap programs.

9 Claims, 4 Drawing Sheets

METHOD FOR STARTING AN OPERATING SYSTEM OF A HANDHELD DEVICE

BACKGROUND

1. Field of the Invention

The present invention generally relates to methods for starting an operating system of a handheld device.

2. Description of Related Art

Generally, a handheld device is a pocket-sized computing device, which typically includes a small visual display for output and a miniature keyboard or touch screen for input. Handheld devices may be mobile phones, personal digital assistants (PDAs), handheld game players, digital cameras, etc.

When a handheld device is accidently turned off, inadvertently or because of interruption of power, the handheld device stays off until the user manually turns on the handheld device. Usually, the users may not be aware that the handheld device has been turned off. Thus, in situations, such as, making an emergency phone call, or having to take a photograph very quickly, the user may have to wait for the handheld device to boot-up before using it and thereby not being able to use the handheld device when needed.

Accordingly, what is needed is a method for starting an operating system of a handheld device, the method can start the operating system of the handheld device in time and make the operating system go into a standby mode directly if the handheld device is turned off accidently.

SUMMARY

A method for starting an operating system of a handheld device is provided. The method includes: setting an alarm time of an alarm clock as T seconds after a current system time of the handheld device when the handheld device is in a standby mode; monitoring the current system time of the handheld device until the current system time of the handheld device reaches a time that is N seconds before the set alarm time, N is less than T; repeating the setting step and the monitoring step, until the handheld device is turned off; determining whether the current system time of the handheld device is equal to the alarm time of the alarm clock when the handheld device is turned on; starting the operating system of the handheld device without executing boot-strap programs and making the operating system go to the standby mode directly if the current system time of the handheld device is equal to the alarm time of the alarm clock; and starting the operating system of the handheld device by executing boot-strap programs if the current system time of the handheld device is not equal to the alarm time of the alarm clock.

Other systems, methods, features, and advantages will be or become apparent to one skilled in the art upon examination of the following drawings and detailed description.

DETAILED DESCRIPTION OF THE EMBODIMENTS

Figure 1:
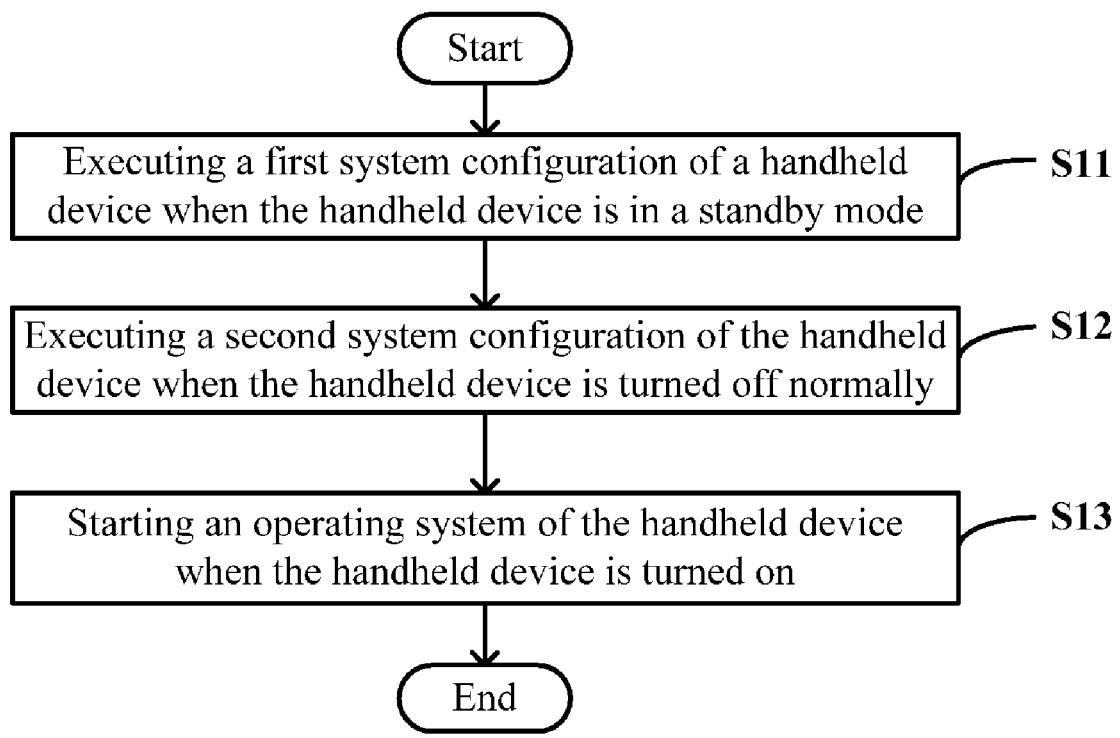
FIG. 1 is a flowchart of a method for starting an operating system of a handheld device in accordance with an exemplary embodiment.

FIG. 1 is a flowchart of a method for starting an operating system of a handheld device in accordance with an exemplary embodiment of the present invention. The handheld device is equipped with an alarm clock. The handheld device may be a mobile phone, a personal digital assistant (PDA), a handheld game player, a digital camera, a palm computer, or other handheld devices.

In step S11, a first system configuration of the handheld device is executed when the handheld device is in a standby mode. The detailed steps of executing the first system configuration of the handheld device are described in FIG. 2.

In step S12, a second system configuration of the handheld device is executed when the handheld device is turned off normally. The detailed steps of executing the second system configuration of the handheld device are described in FIG. 3. The handheld device may be turned off normally by manual shut-off or power shortage, or be turned off abnormally because the power supply is interrupted. In the exemplary embodiment, if the handheld device is turned off abnormally, the handheld device is turned off directly without executing the step S12.

In step S13, an operating system of the handheld device is started when the handheld device is turned on. The detailed steps of starting the operating system of the handheld device are described in FIG. 4.

Figure 2:
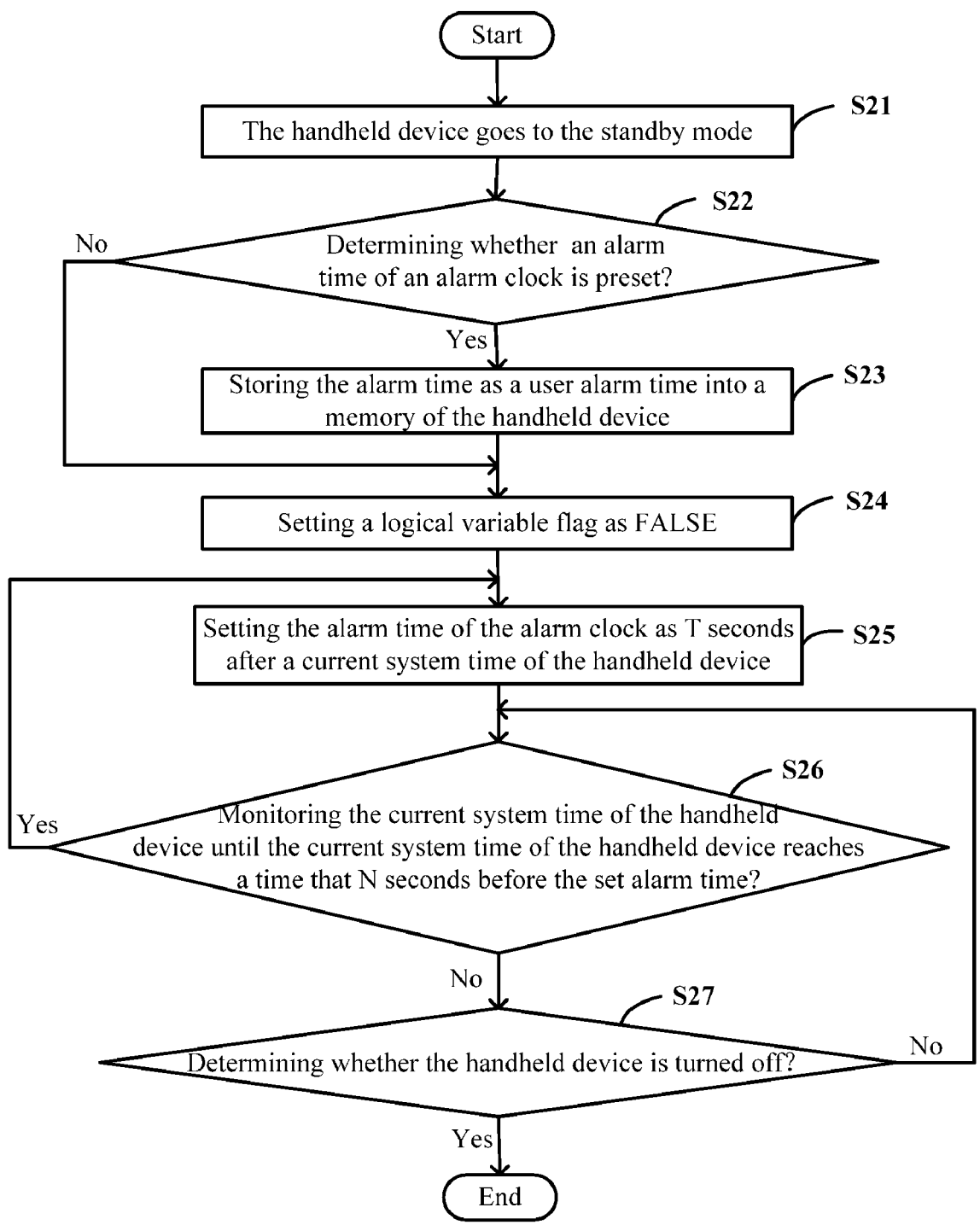
FIG. 2 is a flowchart of executing a first system configuration of the handheld device in FIG. 1.

FIG. 2 is a flowchart of executing the first system configuration of the handheld device, as shown as S11 in FIG. 1.

In step S21, the handheld device goes to the standby mode automatically. In the exemplary embodiment, the handheld device has a special program to detect whether the handheld device is in the standby mode.

In step S22, it is determined whether an alarm time of the alarm clock is preset by a user. If the alarm time of the alarm clock is preset by a user, the procedure goes to step S23; otherwise, if the alarm time of the alarm clock is not preset, the procedure goes to step S24.

In step S23, the preset alarm time is stored as a user alarm time into a memory of the handheld device.

In step S24, a logical variable flag is set as FALSE.

In step S25, the alarm time of the alarm clock is set as T seconds after a current system time of the handheld device. For example, the current system time of the handheld device is 9:00 PM, T is set as 5 seconds, and then the alarm time of the alarm clock is set as 9:05 PM.

In step S26, monitoring the current system time of the handheld device until the current system time of the handheld device reaches a time that is N seconds before the set alarm time. In the exemplary embodiment, N is set as 1. In other embodiments, N may be set as any integer less than T. If the current system time of the handheld device does not reach the time that is N seconds before the set alarm time, the procedure goes to step S27; otherwise, if the current system time of the handheld device reaches the time that is N seconds before the set alarm time, the procedure returns to the step S25.

In step S27, it is determined whether the handheld device is turned off. The handheld device may be turned off normally by manual shut-off or power shortage, or be turned off abnormally because the power supply is interrupted.

If the handheld device is not turned off in step S27, the procedure returns to the step S26; otherwise, if the handheld device is turned off in step S27, the procedure ends.

For example, if the current system time of the handheld device is 15:1 5:10, T is set as 15 seconds, and N is set as 1 second. The steps of the first system configuration include:

setting the alarm time of the alarm clock as 15:15:25 in step S25; determining whether the current system time of the handheld device reaches 15:15:24; if the current system time of the handheld device reaches 15:15:24, setting the alarm time of the alarm clock as 15:15:39, which is 15 seconds after 15:24:15, in step S25; determining whether the current system time of the handheld device reaches 15:15:38; if the current system time of the handheld device reaches 15:15:38, setting the alarm time of the alarm clock in step S25.

Figure 3:
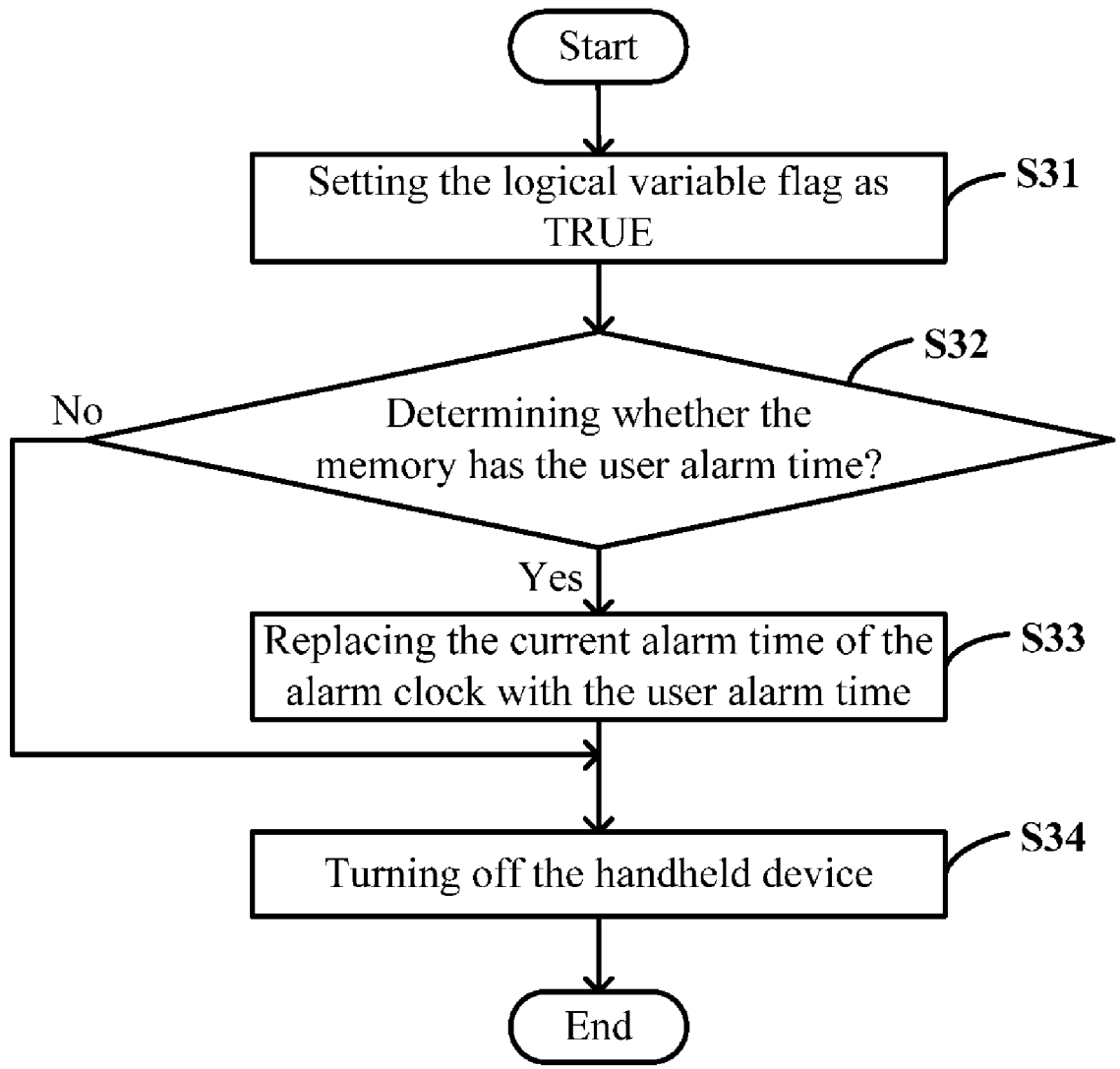
FIG. 3 is a flowchart of executing a second system configuration of the handheld device in FIG. 1.

FIG. 3 is a flowchart of executing the second system configuration of the handheld device, as shown as S12 in FIG. 1.

In step S31, the logical variable flag is set as TRUE.

In step S32, it is determined whether the memory has the user alarm time. If the memory has the user alarm time, the procedure goes to step S33; otherwise, if the memory does not contain the user alarm time, the procedure goes to step S34.

In step S33, replacing the current alarm time of the alarm clock with the user alarm time.

In step S34, the handheld device is turned off.

Figure 4:
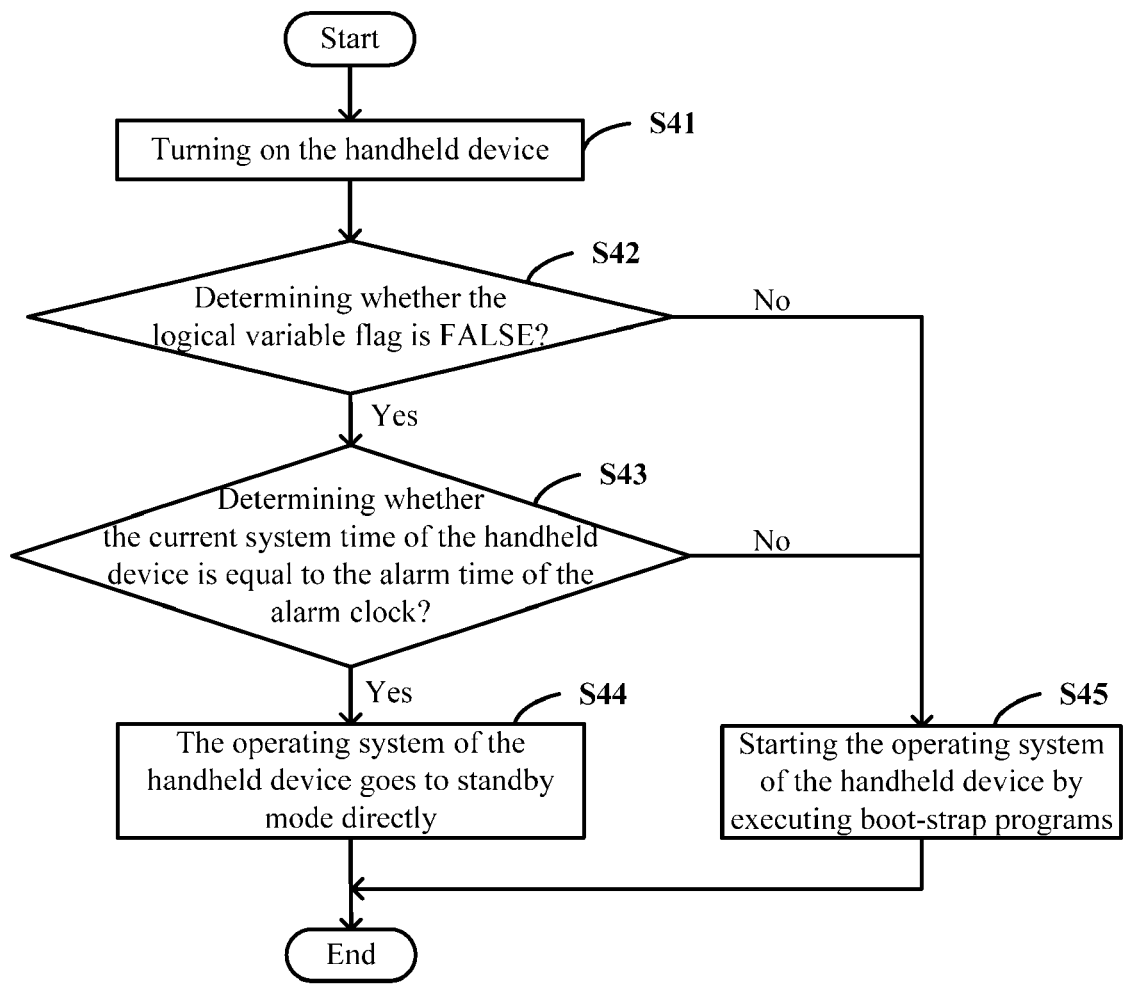
FIG. 4 is a flowchart of starting an operating system of the handheld device in FIG. 1.

FIG. 4 is a flowchart of starting the operating system of the handheld device, as shown as S13 in FIG. 1.

In step S41, the handheld device is turned on. In the exemplary embodiment, the reasons that cause the handheld device to turn on include: triggered by the set alarm time in step S25; triggered by the user alarm time; and manual power-up.

In step S42, it is determined whether the logical variable flag is FALSE. If the logical variable flag is FALSE, the procedure goes to step S43; otherwise, if the logical variable flag is TRUE, the procedure goes to step S45.

In step S43, it is determined whether the current system time of the handheld device is equal to the alarm time of the alarm clock. If the current system time of the handheld device is equal to the alarm time of the alarm clock, which denotes that the handheld device is turned on by triggering the set alarm time in the step S25, the procedure goes to step S44; otherwise if the current system time of the handheld device is not equal to the alarm time of the alarm clock, the procedure goes to the step S45.

In step S44, the operating system of the handheld device is started without executing boot-strap programs and goes to the standby mode directly.

In step S45, the operating system of the handheld device is started by executing boot-strap programs.

It should be emphasized that the above-described embodiments of the exemplary embodiments, particularly, any "exemplary" embodiments, are merely possible examples of implementations, merely set forth for a clear understanding of the principles of the invention. Many variations and modifications may be made to the above-described exemplary embodiment(s) without departing substantially from the spirit and principles of the invention. All such modifications and variations are intended to be included herein within the scope of this disclosure and the above-described exemplary embodiment(s) and protected by the following claims.

What is claimed is:

1. A method for starting an operating system of a handheld device, the method comprising:
setting an alarm time of an alarm clock as T seconds after a current system time of the handheld device when the handheld device is in a standby mode;
monitoring the current system time of the handheld device until the current system time of the handheld device reaches a time that is N seconds before the set alarm time, N is less than T;
repeating the setting step and the monitoring step, until the handheld device is turned off;
determining whether the current system time of the handheld device is equal to the alarm time of the alarm clock when the handheld device is turned on;
starting the operating system of the handheld device without executing boot-strap programs and making the operating system go to the standby mode directly if the current system time of the handheld device is equal to the alarm time of the alarm clock; and
starting the operating system of the handheld device by executing boot-strap programs if the current system time of the handheld device is not equal to the alarm time of the alarm clock.

2. The method according to claim 1, wherein the handheld device is turned off normally or abnormally.

3. The method according to claim 2, wherein the handheld device is turned off normally by manual shut-off or power shortage.

4. The method according to claim 2, wherein the handheld device is turned off abnormally because a power supply of the handheld device is interrupted.

5. The method according to claim 2, further comprising:
determining whether an alarm time of the alarm clock is preset before the setting step;
storing the preset alarm time as a user alarm time into a memory of the handheld device; and
setting a logical variable flag as FALSE.

6. The method according to claim 5, further comprising:
setting the logical variable flag as TRUE if the handheld device is turned off normally; determining whether the memory has the user alarm time; and
replacing the current alarm time of the alarm clock with the user alarm time if the memory has the user alarm time.

7. The method according to claim 6, further comprising:
determining whether the logical variable flag is TRUE or FALSE when the handheld device is turned on; and
starting the operating system of the handheld device by executing boot-strap programs if the logical variable flag is TRUE.

8. The method according to claim 7, further comprising:
determining whether the current system time of the handheld device is equal to the alarm time of the alarm clock if the logical variable flag is FALSE; and
starting the operating system of the handheld device without executing boot-strap programs and making the operating system go to the standby mode directly if the current system time of the handheld device is equal to the alarm time of the alarm clock.

9. The method according to claim 8, further comprising:
starting the operating system of the handheld device by executing boot-strap programs if the current system time of the handheld device is not equal to the alarm time of the alarm clock.

* * * * *